United States Patent [19]

Paletta

[11] Patent Number: 5,525,049
[45] Date of Patent: Jun. 11, 1996

[54] POLYMERIC PIPE DEFORMER

[76] Inventor: Stephen Paletta, 333 N. State Rd., Briarcliff Manor, N.Y. 10510

[21] Appl. No.: 212,069

[22] Filed: Mar. 11, 1994

[51] Int. Cl.$^6$ .................................................. B29C 53/00
[52] U.S. Cl. ........................... 425/62; 425/335; 425/367; 425/397
[58] Field of Search ............................... 425/392, 363, 425/367, 62, 335

[56] References Cited

U.S. PATENT DOCUMENTS

| | | | |
|---|---|---|---|
| 489,950 | 1/1893 | Harrington | 138/143 |
| 3,462,825 | 8/1969 | Pope et al. | 264/249 |
| 3,876,351 | 4/1975 | Takada | 425/62 |
| 3,894,328 | 7/1975 | Jansson | 29/451 |
| 4,207,130 | 6/1980 | Barber | 264/285 |
| 4,504,171 | 3/1985 | Florence, Jr. | 138/97 |
| 4,537,531 | 8/1985 | Diefenthaler | 405/174 |
| 4,863,365 | 9/1989 | Ledoux et al. | 425/392 |
| 5,048,174 | 9/1991 | McGuire | 138/97 |
| 5,091,137 | 2/1992 | Ledoux | 264/269 |
| 5,092,756 | 3/1992 | Gau et al. | 425/392 |
| 5,114,634 | 5/1992 | McMillan et al. | 425/335 |
| 5,167,056 | 12/1992 | McGuire | 29/234 |
| 5,214,835 | 6/1993 | McGuire | 29/451 |
| 5,256,342 | 10/1993 | McMillan et al. | 425/335 |
| 5,374,174 | 12/1994 | Long, Jr. | 425/62 |
| 5,395,472 | 3/1995 | Mandich | 138/97 |

OTHER PUBLICATIONS

"Typical Specification for PLEXCO EHMW PE3408 High Density Polyethylene Pipe and Fittings", Plexco, Bensenville, Il., pp. 1–2, (No date).

*Primary Examiner*—Robert Davis
*Attorney, Agent, or Firm*—Ostrager, Chong & Flaherty

[57] ABSTRACT

An apparatus and method for deforming polymeric pipe to have a reduced diameter for insertion into new or damaged pipelines in situ. A further method for converting existing pipelines in situ to dual-containment pipelines. The apparatus includes a plurality of adjustable rollers and conveyor systems in a portable unit which accommodates variable pipe specifications. As a polymeric pipe is conveyed through the apparatus, a deforming means applies a gradually increasing pressure along the length of the pipe to collapse the pipe and form a longitudinal depression therein while preventing rotation of the pipe. The deformed pipe exits the apparatus after being shaped into a cylindrical form with a reduced diameter. When lining pipe, the deformed pipe is inserted into an existing pipeline and returned to its original cylindrical form. When converting to dual-containment pipelines, the deformed pipe will have a plurality of spacers attached thereon such that when the pipe is inserted and reformed it will be axially aligned within the existing pipeline providing an annular space between the existing pipe and the inserted pipe.

24 Claims, 5 Drawing Sheets

POLYMERIC PIPE DEFORMER

FIELD OF INVENTION

This invention generally relates to a method and apparatus for re-lining new or damaged pipelines in situ and converting existing single-containment pipelines to dual-containment pipelines. More particularly, it is concerned with a deforming apparatus comprising a series of adjustable rollers that convey and deform a polymeric lining pipe into a reduced overall diameter so that it can be inserted into new or damaged pipelines.

BACKGROUND OF INVENTION

Recent federal and state laws have mandated that all industrial waste pipelines must be replaced with dual-containment pipe or that a leak detection system must be installed and activated on each line section. Insofar as there is no cost-effective leak detection system that can be implemented for an existing single-containment pipeline, the only solution is to install a dual-containment pipeline. A dual-containment pipeline consists of an outer pipe and an inner pipe having a diameter less than the outer pipeline. The outer pipe may be made of any conventional piping (i.e. clay, plastic, concrete or metal). When inserted, the inner pipe must be centered within the host pipe so that equal annular space remains between the two pipes. This allows any flow outside of the inner pipe to be detected immediately.

Replacing existing single-containment pipelines with dual-containment pipelines would be overly burdensome. The cost of excavation alone in most industrial areas is excessive due to the contaminated soil surrounding the existing pipelines. Further, it is desirable to minimize destruction of surface features so not to disturb local residences, businesses and utilities. Therefore, a no dig solution for rehabilitating existing pipelines or converting existing single-containment pipelines with a dual-containment system would be beneficial.

It is known in the prior art to line existing pipelines with deformed inner pipelines for repair or restoration in situ. However, these methods provide an inner lining pipe that, when installed, fits snugly within the existing host pipe leaving no space between the two pipes. Tight-fitting pipe lining inserts are conventionally used to enhance the strength of the pipelines. These conventional methods of lining a pipeline include the steps of deforming flexible piping or tubing (e.g. polyethylene) to form a temporary fold therein, holding the tube in its deformed state, inserting the deformed tube into existing pipelines and releasing the tube so that it returns to its original cylindrical form. As representative of such art, reference may be had to U.S. Pat. No. 3,894,328 to Jansson.

In conventional methods, inner lining pipes were produced, deformed and wrapped in coils at the extrusion plants. This process created problems in quality control and increased cost due to excessive freight charges to ship the deformed lining pipe to the site of the pipe requiring the lining. Deforming the pipe away from the lining site also limited the size and the length of the polyethylene pipe that was to be deformed. Short length lining pipes require mechanical joints to fuse the pipes together, resulting in exfiltration of pollutants and chemicals into the surrounding groundwater aquifer. Therefore, the need arose to be able to deform straight cylindrical lengths of polymeric pipe on the actual job site. The prior art also shows deforming lining pipes at the site of a host pipe for insertion therein. However, the art has not provided a portable apparatus suitable for deforming polymeric pipe at the site of a host pipeline without using electrical power.

Figure 1:
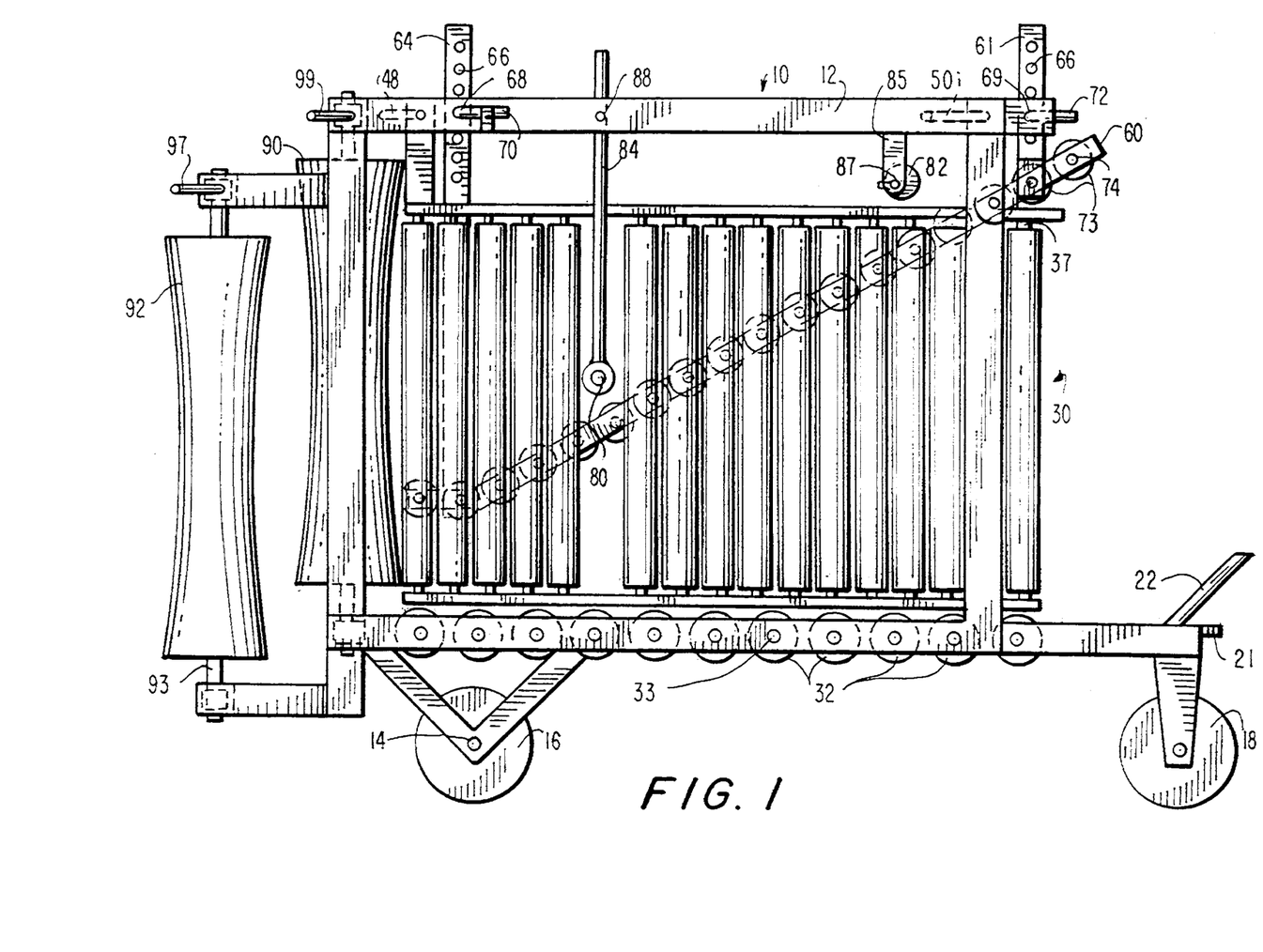
FIG. 1 is a side view of the deforming apparatus.

For example, U.S. Pat. No. 5,091,137 to Ledoux discloses deforming a thermoplastic extrudate (i.e. a lining pipe) into a U-shape to facilitate insertion into the pipe to be lined. In FIG. 1 of the patent, the deforming apparatus comprises a pair of fixed positioning rollers 14 and 16 located perpendicular to one another and a pair of adjustable positioning rollers 18 and 20 also located perpendicular to one another, and opposite rollers 14 and 16. The thermoplastic extrudate is deformed by applying heat and passing it through a motor-driven deforming or penetration wheel. When fully inserted, the lining pipe is pressurized and heated to return the pipe to its original round shape.

U.S. Pat. No. 4,207,130 to Barber shows a method of lining pipes including the steps of extruding the lining pipe on site, deflecting the pipe, holding the pipe in its deflected state, feeding the deflected pipe into a host pipe and releasing the hold on the pipe so that it returns to its original form. The deforming apparatus disclosed in FIG. 1 has a deflecting roller 16 carried by a frame 18 and folding rollers 20. A plastic extrudate 12 passes through a cold water spray 14 to set the plastic material. The deflecting roller then deflects the upper central portion of the tube so that it takes up a horseshoe type configuration and rollers 20 press the sides of the horseshoe cross section together. The lining pipe is propelled through the forming apparatus by driving roller 22 driven by motor 34.

Figure 2:
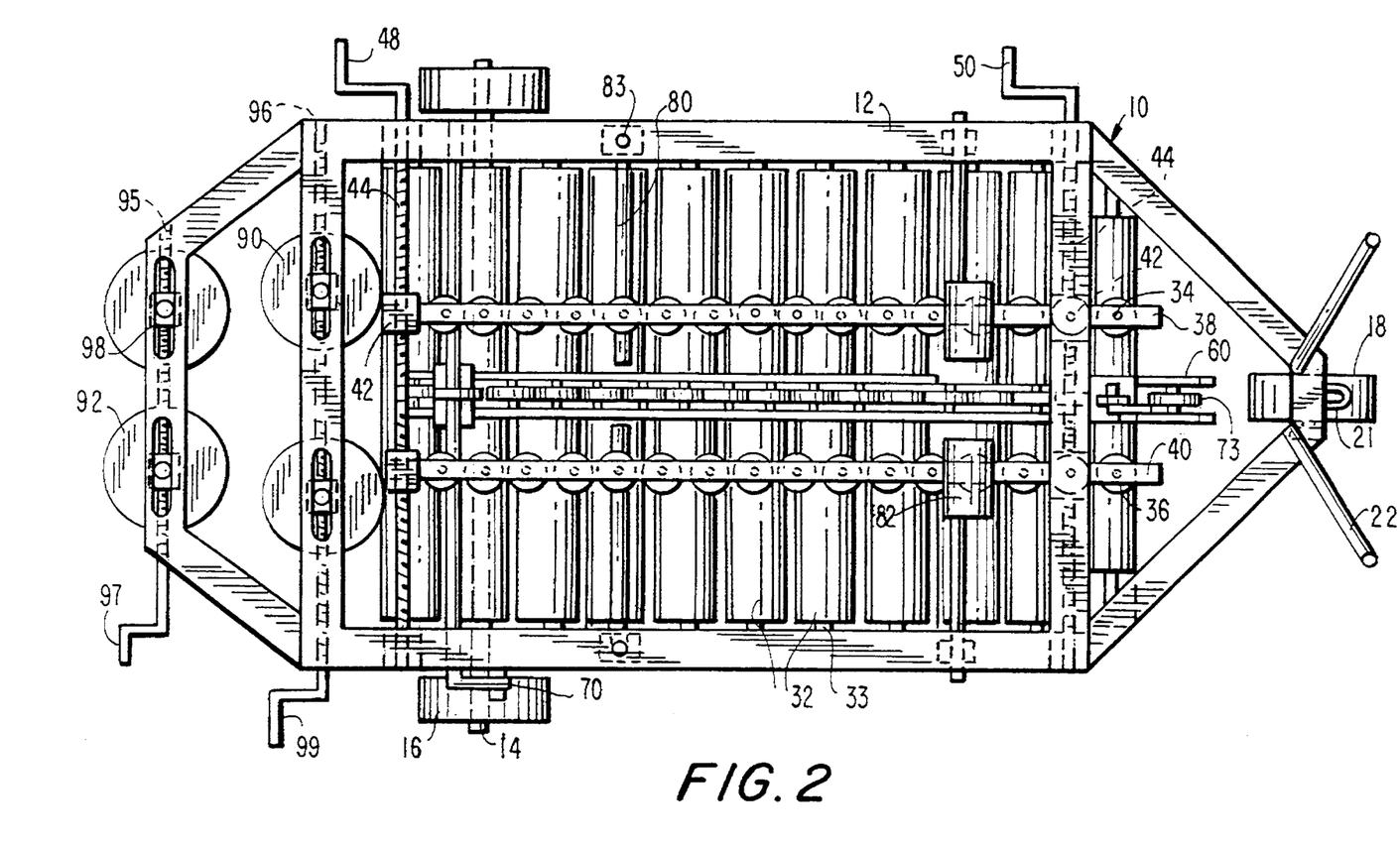
FIG. 2 is a top plan view of the deforming apparatus.

Another approach of the art is exemplified by U.S. Pat. Nos. 5,114,634 and 5,256,342 to McMillan et al. which show reducing the diameter of a lining for insertion into a host pipe by passing an elastomeric liner pipe through five sets of rollers. In FIG. 2 of each patent, it is shown that each of the five sets of rollers define a 360 degree region of contact with the liner and that each set of rollers provides a progressively smaller liner-receiving opening to reduce the diameter of the lining pipe.

SUMMARY OF THE INVENTION

The present invention is directed to a method and apparatus for deforming polymeric lining pipe of variable sizes so that the lining pipe will have a reduced diameter. The invention improves upon known deforming apparatus by incorporating adjustable rollers and conveyor systems in a portable deforming unit which reduces the diameter of a resilient polymeric pipe without the use of electrical power. It will be recognized that such a mechanical arrangement will provide manufacturing and re-lining process efficiencies over known deforming apparatus.

Further, the present invention provides a method for rehabilitation of existing pipelines and conversion of existing single-containment pipelines into dual-containment pipelines using the novel deforming apparatus.

Accordingly, it is a broad object of the invention to provide an improved pipe lining method for rehabilitating new or damaged pipelines in situ.

A more specific object of the invention is to provide a portable apparatus and method for deforming polymeric pipes having variable sizes so that the pipe's diameter is reduced a sufficient amount to fit within a host pipe.

Another object of the invention is to provide a method for converting single-containment pipelines into dual-containment pipelines in situ.

A still further object of the invention is to create a dual-containment pipeline having a resilient lining pipe with sufficient spacers attached thereon to allow the liner to center itself within the host pipe, leaving approximately equal annular space between the host pipe and the newly reformed liner.

The invention generally relates to an apparatus and method for repair or re-lining of new or damaged pipe or conversion of new or damaged pipe into dual-containment pipe. For effectively re-lining a host pipe, it is necessary to obtain a close tolerance between the host pipe and the re-lining insert. For effectively converting existing single-containment pipe to dual-containment pipe, it is necessary to provide an insert that can be centered within the existing pipe so that an annular space remains between the two pipes. Both applications require that a lining pipe have a smaller diameter than a host pipe so that the lining pipe may be inserted into the host pipe. Therefore, an apparatus and method for reducing the diameter of a lining pipe is necessary. This invention achieves these objectives by providing a system of adjustable rollers and conveyors in a portable deforming unit which accommodates variable pipe specifications and does not require electrical power.

In the preferred embodiment, a winch-propelled system of adjustable rollers is mounted to and contained within a portable frame. A cylindrical polymeric pipe enters the unit from an entry side of the frame and is guided to series of adjustable conveying rollers. As the polymeric pipe is conveyed through the unit, an adjustable deforming bar, comprising a series of narrow rollers, applies a gradually increasing pressure along the length of the pipe to form a longitudinal depression therein. The pipe's position is stabilized to prevent it from rotating during deformation. The pipe receives its final round shape by two pairs of adjustable, concave rollers. The first pair lifts the sides of the deformed pipe and the second pair squeezes the sides to reduce the diameter of the pipe.

The deformed lining pipe that exits from the novel deforming apparatus is sufficient for re-lining and rehabilitating existing pipelines. However, when converting a single-containment pipe to a dual-containment pipe, the deformed pipe must have a plurality of spacer members attached on its outer surface. The spacer members allow the lining pipe to be centered within the host pipe so that the dual-containment pipe thus formed has an annular space between the host pipe and the inserted pipe.

Other objects, features and advantages of the present invention will be apparent when the detailed description of the preferred embodiments of the invention are considered in conjunction with the drawings which should be construed in an illustrative and not limiting sense as follows:

DESCRIPTION OF PREFERRED EMBODIMENT

With further reference to the drawings, a preferred embodiment of the deforming apparatus 10 is shown in FIG. 1. The apparatus 10 is a self-contained, portable unit that deforms a resilient polymeric pipe (the "lining pipe") without using electrical power so that the lining pipe has a reduced diameter. By mechanically reducing the diameter of the lining pipe without electrical power, deformation of the polymeric lining pipe can be done economically at the site of the pipe that will be re-lined or converted to a dual-containment pipeline. The apparatus 10 is contained in a portable steel frame 12 mounted on a single rear axle 14 having two rear wheels 16. A front wheel 18 is mounted to frame 12 at an entry position of the lining pipe and is used for steering apparatus 10. A winch cable (not shown) is attached to hook element 21 located at the pipe entry position. The winch cable pulls apparatus 10 enabling the polymeric pipe to be propelled therethrough.

Figure 4:
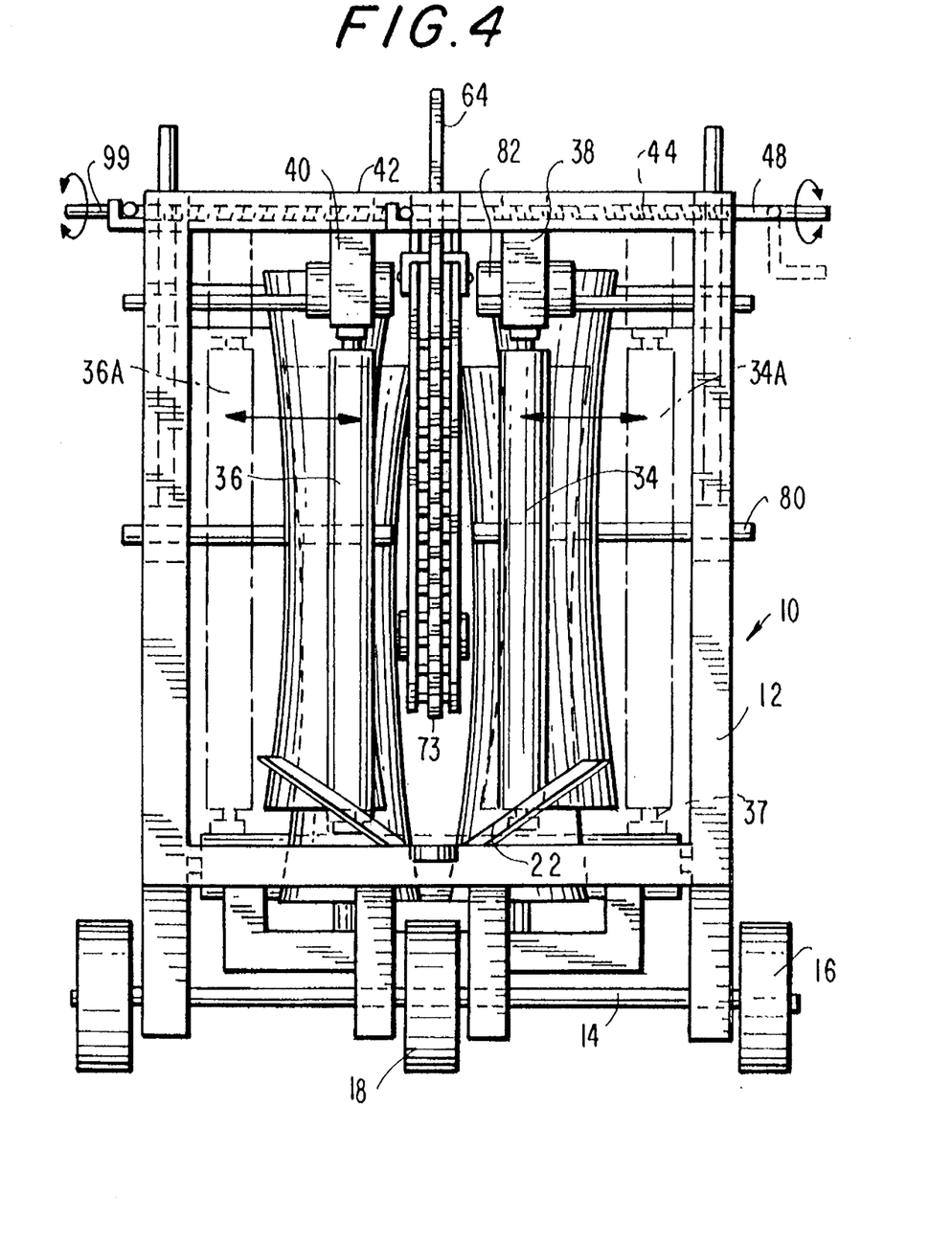
FIG. 4 is a front plan view of the deforming apparatus.

The pipe enters the apparatus through a pair of guide rollers 22 at the pipe entry position (see FIGS. 2 and 4). Each of the guide rollers 22 is rotatably mounted through a central shaft to the bottom horizontal member of frame 12, such that the rollers 22 rotate in a vertical plane. Each of the guide rollers 22 is also angled toward an opposite side of the apparatus such that a V-shaped cradle is formed by the pair. Guide rollers 22 straddle the pipe to support and guide it toward the center of a system of adjustable conveyor rollers 30, which support and convey the pipe through apparatus 10. Conveying system 30 includes a plurality of horizontal conveying rollers 32 rotatably mounted through a central shaft 33 to the bottom horizontal members of frame 12. Rollers 32 rotate in a horizontal direction to convey and support the polymeric lining pipe. In FIG. 2, conveying system 30 further comprises two sets of vertical conveying rollers 34, 36 which surround the lining pipe to ensure that the pipe is conveyed in a straight horizontal path. Each set of vertical conveying rollers 34, 36 is rotatably mounted through a central shaft 37 to roller mounts 38, 40. Roller mounts 38, 40 are attached to frame 10 so that rollers 34, 36 rotate in a vertical direction and allow the pipe to be conveyed between the two sets 34, 36.

To allow pipes of variable sizes to be conveyed and deformed, vertical rollers 34, 36 are adjustable in a horizontal direction. In FIG. 2, both sets of rollers 34, 36 have a block 42 attached to the top of roller mounts 38, 40. Two hand screw shafts 44 run through an elongated channel in the top of frame 12 at the front and the rear of apparatus 10. The screw shafts 44 also run through block 42. Hand cranks 48, 50 are rotatably coupled to screw shafts 44 to provide means for rotating the screw shaft 44. Block 42 acts as a nut so that when screw shaft 44 is rotated, block 42 moves horizontally along the shaft, thus moving vertical rollers 34, 36 therewith. In FIG. 4, vertical rollers 34, 36 are shown in phantom 34A, 36A to indicate the adjustment made to allow a lining pipe having a larger diameter to be conveyed through apparatus 10.

Mounted centrally within the deforming apparatus 10 is a deforming bar 60, shown in FIGS. 1–4. Deforming bar 60 is positioned at an angle to gradually converge with horizontal rollers 32 near the exit position so that a gradually increasing pressure is applied to a polymeric lining pipe as it is conveyed through apparatus 10. Deforming bar 60 is attached to front support bar 61 at the entry position and to rear support bar 64 near the exit position of apparatus 10. To allow variable sizes of pipes to be deformed, support bars 61, 64 are adjustably mounted to frame 12 so that deforming bar 60 can be adjusted in a vertical direction. See FIG. 1. Support bars 61, 64 include a series of locking holes 66. In the upper part of frame 12 there are mounting holes 68, 69 which correspond to locking holes 66, depending on the height at which the deforming bar 60 is set. Locking pins 70, 72 fit through mounting holes 68, 69 and locking holes 66 to lock the deforming bar 60 in place. The rear support bar 64 provides a range of motion for deforming bar 60 from about 1 inch above horizontal roller 32 to about 4 inches above horizontal rollers 32.

Deforming bar 60 is provided with a plurality of spaced narrow rollers 73 rotatably mounted through a central shaft 74 to deforming bar 60. Deforming rollers 73 are configured to gradually deflect the pipe to form a longitudinal depression therein. As the lining pipe is conveyed and deformed, there is a tendency for the pipe to bulge higher on one side of deforming bar 60 than on the other side, causing the pipe to rotate. Therefore, anti-rotational stops 80, 82 are provided to stabilize the position of the pipe during deformation. Two types of anti-rotational stops are shown in FIGS. 2 and 4. Stop 80 is a pair of horizontal bars located on either side of deforming bar 60. Stop 82 is a pair of horizontal rollers also located on both sides of deforming bar 60. Both anti-rotational stops 80, 82 are positioned to apply constant pressure to the top sides of the lining pipe on both sides of the deforming bar and biased against the direction of pipe movement to maintain it in aligned engagement with deforming bar 60.

Anti-rotational stops 80, 82 are adjustably mounted to the top of frame 12 and depend downwardly toward the pipe. The stops 80, 82 are adjustable in a vertical direction to provide additional support to the lining pipe during deformation. In FIG. 1, anti-rotational stop 80 is mounted on support rod 84. Support rod 84 fits through a set screw bore 83 in frame 12 so that it can slide up and down. A set screw 88 is loosened to allow movement of the support rod 84 in a vertical direction and tightened to lock the support rod 84 to frame 12 at the proper height. Anti-rotational stop 82 is adjustably mounted to support bracket 85, which attaches to and depends downward from frame 12. A set screw 87 is loosened to allow stop 82 to move in a vertical direction and tightened to lock stop 82 to support rod 85 at the proper height.

Figure 3:
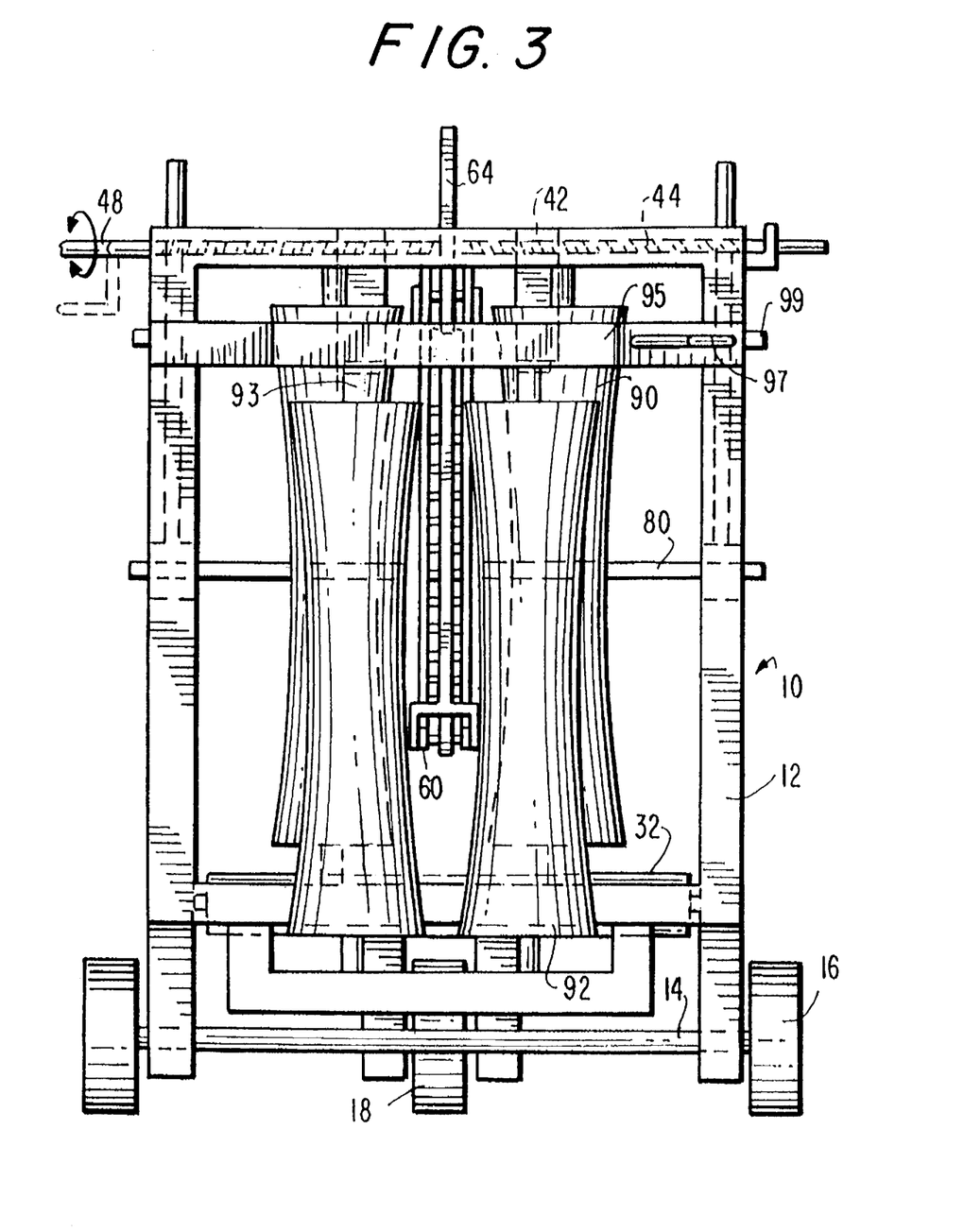
FIG. 3 is a rear plan view of the deforming apparatus.

After the pipe is deformed, it passes through shaping rollers 90, 92. Shaping rollers 90, 92 include two pairs of concave rollers rotatably mounted through a central shaft 93 to frame 12 so that they rotate in a vertical direction. In FIGS. 2 and 3, the second pair 92 has its rollers spaced closer together than first pair 90 to provide a pipe squeezing function. Both pairs of shaping rollers are adjustably mounted to frame 12 to allow for pipes of variable sizes to obtain their final shape. Concave shaping rollers 90, 92 adjust in a horizontal direction similar to vertical conveying rollers 34, 36. Concave shaping rollers 90, 92 each have block 98 attached to the top of the roller. Hand screw shafts 95, 96 run through blocks 98 and through an elongated slot in frame 12. Hand cranks 97, 99 are coupled to screw shaft 95, 96 to provide means for rotating screw shafts 95, 96 and adjusting shaping rollers 90, 92.

Preferred rollers for use in the invention are fabricated of metal, plastic or other conventional materials having a polyurethane coating and are commercially available from Precision Urethane Inc., Heampstead, Tex. Advantageously, the use of a polyurethane coating provides a resiliency during the deforming operation to maintain the integrity of the lining pipes (i.e. to prevent breaking or cracking). Dimensions of the rollers will vary depending on the diameter of the lining pipe to be deformed. Generally, lining pipes having large diameters will require rollers having large diameters. The concavity of shaping rollers 90, 92 must also be greater as the diameter of the lining pipe increases. For example, to deform a lining pipe having a diameter between 8 inches and 15 inches, the following roller specifications are preferred:

| Roller | Diameter | Length | Shaft Diam. | Shaft Length |
|---|---|---|---|---|
| Conveyors (32, 34, 36) | 12 in. | 24 in. | 1.5 in. | 28 in. |
| Shaping Rollers 90, 92 | 6 in.[1] | 18 in. | 1 in. | 22 in. |
| Deforming Rollers 73 | 4 in. | 2 in. | | |

[1]Middle diameter of concave shaping rollers 90, 92 is 1.5 inches.

The mechanical components of the deforming apparatus 10 have now been fully described, and it will be advantageous for a full understanding of the invention, to discuss the apparatus in terms of function.

For re-lining existing pipes (the "host pipe") in situ, a polymeric lining pipe is laid out at the site in the appropriate length and diameter. Polymeric lining pipes for use in the invention are preferably manufactured from a high-density, extra high molecular weight polyethylene pipe compound. The pipe should have a low modulus of elasticity, allowing the pipe to be repeatedly squeezed to the point where the walls meet and returned to near roundness. A suitable polymeric pipe for use in the invention is PLEXCO EHMW PE3408 High Density Polyethylene Pipe manufactured by Plexco, Bensenville, Ill. This pipe meets the general requirements of ASTM-1248 "Standard Specifications of Polyethylene Plastics, Molding and Extrusion Material" and Classification requirements of Type III, Class C, Category 5, Grade P34 and cell classification 345434C per D-3350. The PLEXCO pipe has the following characteristics:

| | |
|---|---|
| Density | 0.955 gm/cm³ |
| Flexural Modulus | 133,000 psi |
| Tensile Strength | 3500 psi |
| Elastic Modulus | 111,000 psi |
| Vicat Softening Temperature | 255° F. |
| Molecular Weight | 330,000 as per the Gel Permeation Chromatography determination procedure |

For re-lining purposes, the outside diameter and minimum wall thickness of the pipe shall be fabricated to a size that when installed, will nearly fit the internal circumference of the host conduit. Standard dimension ratio of the liner shall be based on the evaluation of the design considerations. These considerations normally include an evaluation of internal pressure, flow capacity, condition of existing carrier pipe, and external loads such as hydrostatic pressure and/or static and dynamic earth loads.

The deforming apparatus 10 is positioned over one end of the polymeric pipe. The pipe is placed on guide rollers 22 so that it is fed toward conveying system 30. Hand cranks 48, 50 are then rotated to move vertical conveyors 34, 36 inward or outward so that the lining pipe fits therebetween and deforming bar 60 is adjusted to the proper height by removing locking pins 70, 72, raising or lowering support bars 61, 61 and replacing locking pins 70, 72. The apparatus is then pulled by a winch, thus forcing the lining pipe to be conveyed through the apparatus. As the pipe is conveyed, deforming bar 60 applies a gradually increasing pressure to the pipe so that the pipe collapses, forming a longitudinal depression therein. Advantageously, no electrical power is required to form the depression. To prevent rotation of the pipe during deformation, anti-rotational stops 80, 82 are adjusted to the proper height to apply constant pressure to the pipe on both sides of the depression.

After the pipe is deformed, it passes through two pairs of shaping rollers 90, 92 at the exit position. Hand crank 99 is used to adjust the first set of shaping rollers 90 to have a sufficient distance therebetween to lift the sides of the deformed pipe. The second set of shaping rollers 92 is adjusted by hand crank 97 so that rollers 92 have a sufficient distance therebetween to squeeze the sides of the pipe together to form a cylindrical pipe having a reduced diameter. Typical pipes will have a new diameter 0.67d, where d is the original diameter of the pipe.

As the deformed pipe exits apparatus 10, it is wound with tape to secure the pipe in its deformed state. The deformed pipe can then be inserted into a host pipe by conventional means and released so that its original cylindrical form returns. Typical methods include applying steam and air pressure into the pipe to allow the pipe to regain-its original form.

Figure 5A:
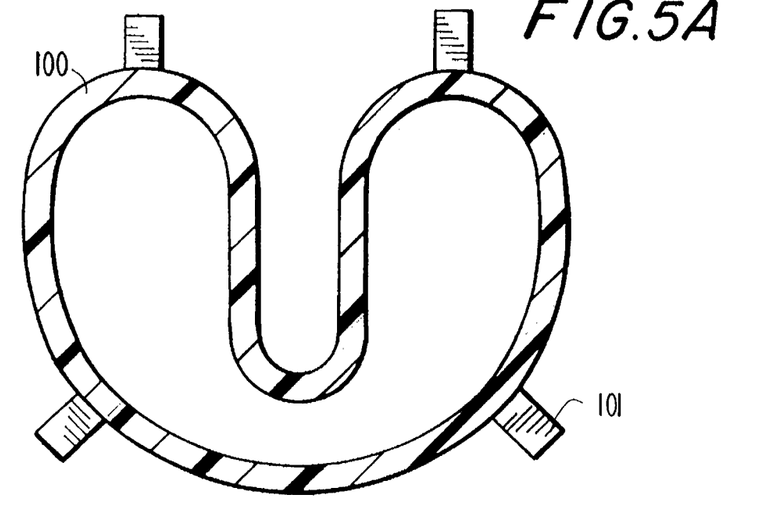
FIG. 5A is a cross sectional view of a deformed polymeric pipe with spacers before insertion into a host pipe in accordance with the invention.
Figure 5B:
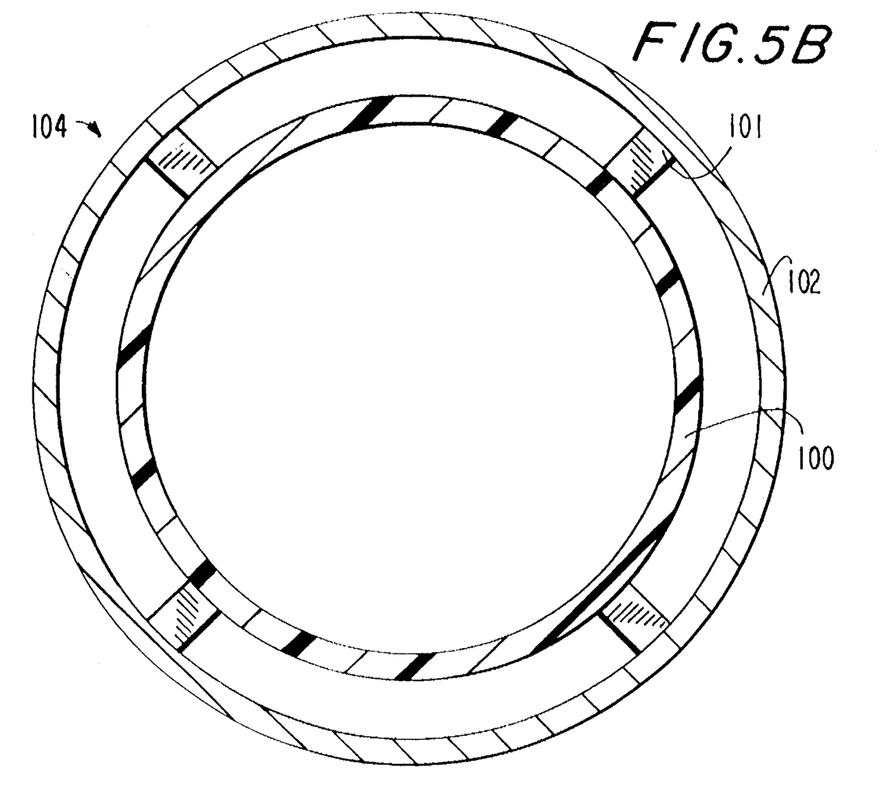
FIG. 5B is a cross sectional view of a dual-containment pipe having the reformed polymeric pipe with spacers inserted into a host pipe in accordance with the invention.

However, conventional methods cannot be used to convert single-containment pipe to dual-containment pipe. In FIG. 5A, a suitable lining pipe 100 to convert from single-containment to dual-containment pipe is shown. A plurality of spacer members 101 project from the outer surface of lining pipe 100. In the preferred embodiment, spacer members 101 are made of polyethylene having characteristics similar to that of lining pipe 100. Spacer members 101 having a length of approximately six inches are extrusion welded onto the outer surface of lining pipe 100 and spaced every five feet in an axial direction. In the circumferential direction, spacer members 101 should be distributed at equiangular intervals from each other. When lining pipe 100 is inserted into a host pipe 102 and reformed to its original cylindrical shape, the dual-containment pipe 104, shown in FIG. 5B, is formed. The lining pipe 100 is axially aligned within the host pipe 102 and equal annular spaces are formed therebetween.

From the foregoing, it will be appreciated that the present invention provides a deforming apparatus 10 which achieves the objects stated heretofore. A deforming apparatus is provided which includes a series of-adjustable rollers and conveyor systems that deform a polymeric pipe. In particular, an adjustable deforming bar 60 is provided to apply a gradually increasing pressure to the pipe to form a longitudinal depression therein. Advantage is obtained by employing rollers in a portable unit that gradually apply pressure to the pipe and do not require the use of electrical power to convey or deform the pipe.

Numerous modifications are possible in light of the above disclosure. For example, although a deforming bar 60 comprising a series of rollers is shown in the drawings, a single deforming roller is within the scope of this invention. Similarly, the configuration of conveyor rollers 30 can be modified to any system that provides support and conveys the pipe through the apparatus. Although the preferred embodiment does not require the use of electrical power, it is within the scope of the invention to provide an electric power driven arrangement of rollers. Further, although the anti-rotational stops 80, 82 are shown to be rollers in the drawings, any horizontal bar that will provide upper stabilization is within the scope of this invention.

With respect to the dual-containment pipe shown in FIG. 5B, although it is disclosed that the polymeric lining pipe is deformed at the site of the host pipe and spacer members 101 are attached thereon after deformation, it is within the scope of this invention that spacer members 101 be attached at the extrusion plant before deformation of the pipe. This would enable dual-containment pipe to be manufactured and sold as a pre-fabricated pipe. Further, although four spacer members 101 are shown in FIG. 5, it is foreseen that any number of spacer members 101 can be used providing that annular spaces between the host pipe and the lining pipe are maintained. Lastly, spacer members 101 may have continuous lengths equal to the length of the lining pipe rather than short six-inch pieces.

Therefore, although the invention has been described with reference to certain preferred embodiments, it will be appreciated that other deforming apparatus and dual-containment pipe may be devised, which are nevertheless within the scope and spirit of the invention as defined by the claims appended hereto.

I claim:

1. An apparatus for deforming a polymeric pipe so that the pipe has a reduced diameter, said apparatus comprising:

a frame;

means for conveying the pipe from an entry position of said frame to an exit position of said frame, said exit position being at a side opposite the entry position; and deforming means, actuated between said entry position and said exit position, for forming a longitudinal depression in the pipe, said deforming means comprising a series of rollers adjustably mounted to an upper horizontal member of said frame and angled to gradually converge with the pipe such that a gradually increasing pressure is applied to the pipe to form said depression.

2. The apparatus as set forth in claim 1 further comprising means for shaping the deformed pipe to have a cylindrical form, said shaping means being actuated at said exit position.

3. The apparatus as set forth in claim 1 further comprising position stabilizing means for preventing rotation of the pipe.

4. The apparatus as set forth in claim 1 further comprising means for adjusting the apparatus to allow for deformation of pipes having variable diameters.

5. The apparatus as set forth in claim 1 further comprising means for guiding the pipe from said entry position to said conveying means.

6. The apparatus as set forth in claim 1, wherein said conveying means comprises a first set of rollers horizontally secured to a base of said frame, a second set of rollers vertically secured to one side of said frame, and a third set of rollers vertically secured to an opposite side of said frame, the pipe being disposed flat atop said first set of rollers and between said second and third set of rollers.

7. The apparatus as set forth in claim 6, wherein said series of rollers of said deforming means opposes said first set of rollers of said conveying means and gradually converges with said first set of rollers near said exit position.

8. The apparatus as set forth in claim 2, wherein said shaping means comprises a first and second pair of rollers having a concave shape, said second pair being spaced closer together than said first pair to provide the pipe with said reduced diameter.

9. The apparatus as set forth in claim 3, wherein said position stabilizing means comprises an adjustable roller for applying stable vertical pressure to the pipe around said longitudinal depression.

10. The apparatus as set forth in claim 4, wherein said adjusting means comprises a hand crank rotatably mounted to said frame.

11. The apparatus as set forth in claim 1, wherein said frame is mounted on a rear axle and a front wheel that allows for steering.

12. The apparatus as set forth in claim 5, wherein said guiding means is a pair of rollers angularly mounted to said frame in a vertical plane, such that a V-shaped cradle is formed by said pair.

13. An apparatus for deforming a polymeric pipe so that the pipe has a reduced diameter, the apparatus comprising:

a frame;

means for conveying the pipe from an entry position of said frame to an exit position of said frame, said exit position being at a side opposite the entry position, wherein said conveying means comprises a first set of rollers horizontally secured to a base of said frame, a second set of rollers vertically secured to one side of said frame, and a third set of rollers vertically secured to an opposite side of said frame, the pipe being disposed flat atop said first set of rollers and between said second and third set of rollers; and deforming means, actuated between said entry position and said exit position, for forming a longitudinal depression in the pipe, said deforming means comprising a series of narrow rollers pivotally secured to an upper member of said frame and opposing said first set of rollers of said conveying means, said deforming means being adjustably angled to gradually converge with said first set of rollers near said exit position;

wherein said deforming means applies a gradually increasing pressure along the pipe to form said depression.

14. The apparatus as set forth in claim 13 further comprising means for shaping the deformed pipe to have a cylindrical form, said shaping means being actuated at said exit position.

15. The apparatus as set forth in claim 13 further comprising position stabilizing means for preventing rotation of the pipe.

16. The apparatus as set forth in claim 13 further comprising means for adjusting the apparatus to allow for deformation of pipes having variable diameters.

17. The apparatus as set forth in claim 13 further comprising means for guiding the pipe from said entry position to said conveying means.

18. The apparatus as set forth in claim 14, wherein said shaping means comprises a first and second pair of rollers having a concave shape, said second pair being spaced closer together than said first pair to provide the pipe with said reduced diameter.

19. The apparatus as set forth in claim 15, wherein said position stabilizing means comprises an adjustable roller for applying stable vertical pressure to the pipe around said longitudinal depression.

20. The apparatus as set forth in claim 16, wherein said adjusting means comprises a hand crank rotatably mounted to said frame.

21. The apparatus as set forth in claim 13, wherein said frame is mounted on a rear axle and a front wheel that allows for steering.

22. The apparatus as set forth in claim 17, wherein said guiding means is a pair of rollers angularly mounted to said frame in a vertical plane, such that a V-shaped cradle is formed by said pair.

23. An apparatus for deforming a polymeric pipe so that the pipe has a reduced diameter, the apparatus comprising:

a frame;

means for conveying the pipe from an entry position of said frame to an exit position of said frame, said exit position being at a side opposite the entry position; and deforming means, actuated between said entry position and said exit position, for forming a longitudinal depression in the pipe, said deforming means comprising a series of narrow rollers pivotally secured to an upper horizontal member of said frame and adjustably angled to gradually converge with the pipe such that a gradually increasing pressure is applied to the pipe to form said depression.

24. The apparatus as set forth in claim 23, wherein said conveying means comprises a first set of rollers horizontally secured to a base of said frame, the pipe being disposed flat atop said first set of rollers, wherein said series of narrow rollers of said deforming means opposes said first set of rollers of said conveying means such that said deforming means gradually converges with said first set of rollers near said exit position.

* * * * *